Patented Oct. 23, 1934

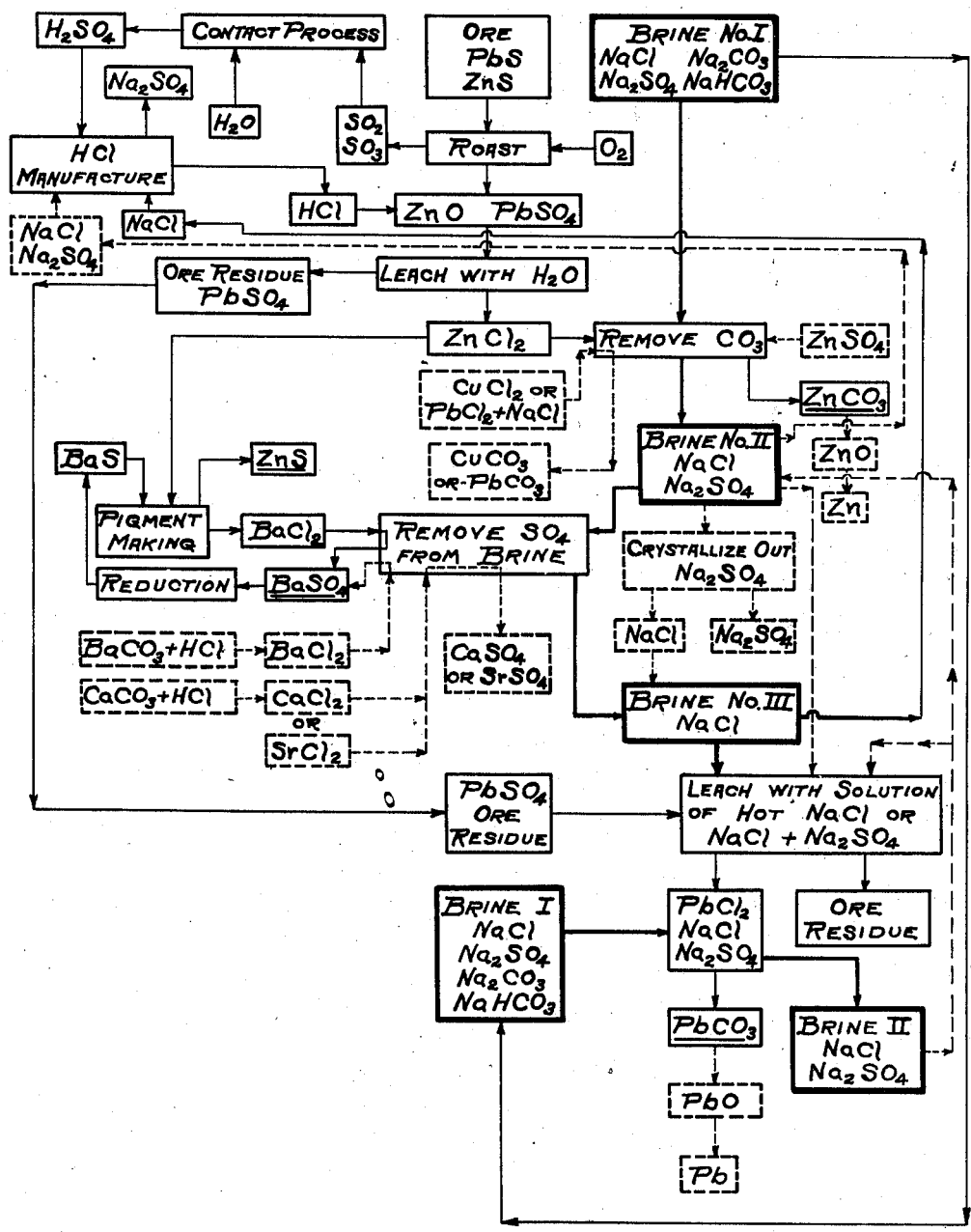

1,977,648

UNITED STATES PATENT OFFICE 1,977,648

METHOD OF TREATING ORE MATERIAL WITH A COMPLEX BRINE

Royal L. Sessions, Denver, Colo., assignor, by mesne assignments, to Hughes-Mitchell Processes, Incorporated, Denver, Colo., a corporation of Wyoming Application May 5, 1932, Serial No. 609,361

16 Claims. (Cl. 75—18)

This invention relates to the treatment of ores for recovering values therefrom and to the use of a complex brine in a sequence of steps which are so conducted and arranged that the different constituents of the brine may be employed efficiently in the treatment of ore materials.

In the course of my experimentation, I have found it to be feasible to employ in a series of hydrometallurgical steps a complex brine containing a mixture of the carbonate, the sulfate and the chloride of an alkali metal, such as sodium, which has heretofore been considered a material of little practical or commercial value because of the expense involved in separating the different salts therein.

The primary object of my invention is to so arrange and coordinate various process steps that a complex brine of this type may be employed effectively and economically in the treatment of complex ore materials for recovering values therefrom, in which the different acid ions are used serially to accomplish reactions for which they are adapted without detrimentally affecting other constituents of the ore material being treated.

A further object is to so treat the brine that undesired constituents may be removed and a desired salt or mixture of salts recovered, and to employ such a series of steps that the process of purification is commercially practical and so economical or self-supporting that the cost of recovering the desired end product may be allocated to the cost of treating the ore materials and thus make the process and the use or sale of the desired salt profitable.

A further object of this invention is to so treat the brine cyclically that the carbonate and sulfate radicals may be removed therefrom economically while serving usefully in an ore treatment, and the residual salt or salts may be employed in the manufacture of hydrochloric acid required for the production of an ore metal chloride which in turn aids in the process of purifying the brine.

A further object of the invention involves the treatment of an ore material containing lead sulfate which results in the formation of lead carbonate commercially free from lead sulfate, and particularly to employ the brine above described for this purpose.

With these and other objects in view, as will be apparent to one skilled in the art, my invention resides in the combination of process steps set forth in the specification and covered by the claims appended hereto.

In order that the invention may be fully understood, I have described herein a process of employing in the treatment of ore materials a brine which may have the following composition:

| Analysis of brine | | Analysis of dry material | |
|---|---|---|---|
| $Cl$ | 24.82% | Sodium chloride | 8.8% |
| $SO_4$ | 9.93 | Sodium carbonate | 52.5 |
| $CO_3$ | 24.55 | Sodium sulfate | 37.5 |
| $PO_4$ | .11 | | |
| $B_4O_7$ | .14 | | 98.8 |
| $NO_3$ | .45 | | |
| $Na$ | 38.09 | | |
| $K$ | 1.62 | | |
| $Li$ | .03 | | |
| $Ca$ | .02 | | |
| $Mg$ | .01 | | |
| $SiO_2$ | .14 | | |
| $Al_2O_3+Fe_2O_3$ | .04 | | |
| $As_2O_3$ | .05 | | |

It will, however, be understood that this invention is applicable to solutions and to a mixture of their dry salts, which are derived from brines of this general class containing sodium or potassium chlorides, carbonates and sulfates, whatever may be the strength of the solution or the exact proportions of the constituents in the brine or the dry salt mixture; as well as to the mixture of salts obtained from either the original brine or the partially purified brines recovered from any stage of the process, which may be obtained by a complete or partial removal, as by evaporation, of the water solvent.

I have found that this brine has great utility, if employed at the proper stages in the treatment of various ore materials, such as a complex sulfide ore, and particularly one containing compounds of zinc, copper and lead as well as other desired metal values which are to be recovered. While the process is applicable to many ore materials, whether they are raw ores, rich, lean or concentrates, or they comprise partially treated ores, such as roasted and chloridized sulfide ores, the invention is herein described with reference to a sulfide ore containing zinc and lead which are to be separated and to the use of the various constituents of the brine as well as the recovery of sodium chloride or a mixture of salts for sale or reuse in the process. This brine is herein considered to be made up of Na₂CO₃, NaHCO₃, Na₂SO₄ and NaCl; and the proportions of the different ingredients and the concentrations of the solution employed may be modified and made such as is most economical and efficient for the particular reactions being carried on. However, for the particular process herein described, it may be assumed that the solution will satisfy the following requirements for treating a lead and zinc sulfide ore concentrate calculated as the approximate amount of dry brine salts necessary for precipitating all of the zinc and lead in 100 tons of bulk ore concentrates:

For zinc—41 tons soda ash—77 tons of dry brine salts.

For lead—8 tons soda ash—16 tons of dry brine salts.

On the basis that one-half of the zinc is converted to zinc sulfide and one-half to zinc oxide or metal, the requirements are:

| | |
|---|---|
| For zinc | 39 tons dry salts |
| For lead | 16 tons dry salts |
| Total | 53 tons dry salts |

This table shows that if the zinc content of the ore requires 41 tons of soda ash for its treatment, then 77 tons of the dry salt of the above analysis will serve the same purpose. These various figures show the practicability of the process.

In order that the different aspects of this invention may be understood, reference is had to the drawing, which illustrates diagrammatically a scheme including alternative steps for the treatment of a lead and zinc sulfide ore and for the use of this brine in such ore treatment. The brine has a content of sodium carbonate which is extremely valuable in this process, in that it serves as a precipitating agent for removing zinc, copper and lead from their solutions. It also has a content of chloridion which is useful in various ways, such as in the manufacture of hydrochloric acid for treatment of the ore and in dissolving the lead sulfate in the ore residue. The sulfate ion has various uses, likewise, such as precipitating an alkaline earth metal from solution, as indicated on the drawing. The lead sulfate in an ore residue may be converted to lead chloride by leaching with either a hot solution of sodium chloride or a hot solution of the partially treated brine containing sodium chloride and sodium sulfate and from which the sodium carbonate has been removed. In accordance with a particular feature of this invention, the lead chloride, which is dissolved in the hot sodium chloride and sulfate solution, may be precipitated as lead carbonate commercially free from lead sulfate by means of the complete or original brine containing the carbonate, sulfate and chloride ions, or by a solution otherwise derived containing sodium sulfate as well as sodium carbonate, which acts in the presence of the sodium chloride employed to hold the lead in solution as a chloride. It will also be apparent from inspection of the drawing, that the various constituents of the brine are useful in various stages of the process and that this process may be modified in many ways to make efficient use of the brine and its ingredients. By means of this procedure, this complex brine is made to replace many of the commercial reagents used in the chemical industry, such as soda ash, salt cake, common salt, glauber salts, etc.

Assuming that the ore material to be treated comprises lead and zinc sulfides along with various other materials constituting the gangue and which may contain other ore metal values, such as copper, iron etc., I may proceed in accordance with the following process. The ore is first crushed to a suitable degree of fineness and is then roasted under oxidizing conditions and in accordance with any suitable procedure to form zinc oxide and lead sulfate. The sulfur dioxide and trioxide gases derived from the roasting operation may be carried through a contact process and combined with water for the manufacture of sulfuric acid, and this acid may then be employed for the manufacture of hydrochloric acid by reaction with sodium chloride derived from a later stage in the process. It will also be particularly noticeable that I may employ in making the HCl a mixture of sodium chloride and sodium sulfate (brine No. 2) derived from this process, and that the sodium sulfate which is there present will not only do no harm but will go with the sodium sulfate formed during the process, thereby serving in a very efficient way to take the chlorine ion out of the solution and concentrate the sulfate ions in the sodium sulfate which in turn may be employed in various desired ways.

The hydrochloric acid derived from this process may then be utilized to convert zinc oxide in the roasted ore material to zinc chloride. Any suitable procedure may be employed for the purpose, but in accordance with one preferred method the hydrochloric acid is passed as a gas over the substantially dry roasted ore material and thus serves to convert the zinc oxide to zinc chloride which may be separated from the ore material by the simple expedient of leaching with water. This leaves the lead sulfate with the ore gangue which will be treated in a subsequent stage for the conversion of the lead compound to a chloride and then to a carbonate. We now have a solution of zinc chloride which serves as our first reagent for initially removing the carbonate radical from the brine.

The original brine containing the carbonate radical is labeled on the drawing as "Brine No. 1", and the material actually used in the process may be derived from the dry salt formed by evaporation of the original brine or it may be the initial brine solution of any suitable concentration, and the proportions of the several ingredients may be varied as required for the particular step being carried out. Whatever type of material is used will, of course, depend upon the desires of the chemist in charge of the operation and what economic results are required. This complex brine may be derived from various sources, either artificial or natural. Because of its composition, such a brine has heretofore been considered of little economic value. However, in accordance with this procedure, it has now become the primary reagent in a commercially practical process.

The carbonate radical in the brine may appear as sodium carbonate and sodium bicarbonate. By treating the zinc chloride solution with this brine or the dry ingredients thereof in the required proportions, the carbonate radical is removed from the brine, with the resultant precipitation of zinc carbonate. The chlorine ion of the zinc chloride remains in solution as sodium chloride, thus increasing the sodium chloride content of the brine. This step is carried out with suitable concentrations and proportions of the ingredients. The resultant second-stage solution is designated as "Brine No. 2".

It is also to be understood that various other sources of this primary reagent for removing carbonate from the brine may be employed. The main condition which I prefer to impose on this stage of the process is that such a reagent shall be used for removing the carbonate radical from brine No. 1 that no new or different anion shall be introduced into the brine. Consequently, I may employ the soluble chloride or sulfate of various metals. For example, I may use the chloride of copper, lead or zinc or other suitable ore metals which form insoluble carbonates. If the ore material contains copper sulfide or oxide, it may be chloridized in the same manner as the zinc and thus employed for removing carbonate from the brine and precipitating copper carbonate. Likewise, lead chloride dissolved in a hot solution of sodium chloride, or brine No. 2, as derived from later stages in the process or as obtained elsewhere, may be used for this purpose and at this stage or other stages in the process.

Also, it will be understood that the soluble sulfates of various ore metals may be employed in the same manner, since these introduce no new anion into the brine. If the roasting operation has been so carried on as to produce zinc sulfate, either alone or intermingled with zinc oxide, the zinc sulfate may be derived from the roasted ore by a leaching operation, or all of the zinc oxide may be converted to a sulfate and the latter recovered. This zinc sulfate may then be combined with the brine, with the resultant precipitation of zinc carbonate and the removal of the carbonate radical from the brine. The zinc carbonate thus formed may be converted, if desired, to the oxide by calcination and then reduced to the metal, or it may be otherwise treated.

Whatever process step is used in this first stage, as above indicated, the resultant brine No. 2, which is now ready for use in a second stage, contains only the sodium, chlorine and sulfate ions along with the various impurities, or useful reagents added for desired purposes, which may be present in the brine. This partially purified brine consisting primarily of sodium chloride and sodium sulfate may now be used in various important process steps. For example, a portion of it may be passed through the process for making hydrochloric acid and so result in the removal of the chlorine ion from the brine and the production of a solution high in sodium sulfate content. I prefer to carry a portion or all of the brine No. 2 through a further purification step where its sulfate ion is put to useful work. If it is desired merely to obtain sodium chloride for sale on the market or for use in the hydrochloric acid process or elsewhere, then the next step of my process may involve removing the sulfate radical by evaporating the solution and fractionally crystallizing out the sodium sulfate.

I have, however, found that the sulfate content of the brine is particularly useful in the process of treating alkaline earth materials and that in turn the latter are useful in purifying the brine, by precipitating the sulfate radical as an insoluble sulfate. For example, zinc chloride derived from the ore may be employed in the manufacture of the pigment zinc sulfide. This is accomplished, in accordance with standard procedure, by combining solutions of zinc chloride and barium sulfide of required concentrations and molecular proportions, with the resultant precipitation of zinc sulfide and leaving a solution of barium chloride. In order to regenerate the barium sulfide required in the process, this barium chloride solution may now be treated with the second-stage brine No. 2. This results in the precipitation of barium sulfate or blanc fixe, which may be separated from the solution and subsequently furnaced with carbon at a required temperature to reduce it to barium sulfide; and the latter may then be leached from the furnace charge to re-form the barium sulfide required in the pigment-making process. This procedure, therefore, serves as a very simple way of utilizing this brine to make the pigment process in part cyclic. The brine solution No. 3 which results from the treatment of the barium chloride with brine No. 2 is primarily made up of sodium chloride, and this may be returned for the hydrochloric acid manufacture or for commercial sale or otherwise used as desired.

As an alternative procedure for removing the sulfate radical from brine No. 2, I may employ the chlorides of the other alkaline earth metals, calcium and strontium. For example, limestone may be treated with hydrochloric acid to form calcium chloride and when this is combined with brine No. 2, a precipitate of calcium sulfate is formed. Also, the calcium chloride may be derived from other stages in the ore treatment. Likewise, strontium chloride may be formed in any suitable way and used to precipitate strontium sulfate by means of the brine. Barium chloride may also be derived from other sources besides that of making pigment. For example, witherite may be treated with hydrochloric acid to form barium chloride and this likewise used to form barium sulfate. These examples indicate how flexible is this process and that any suitable material capable of removing the sulfate ion as an insoluble material may be employed. I, however, prefer to use one of the alkaline earth metal chlorides above specified.

The sodium chloride solution forming brine No. 3 is particularly useful for leaching lead sulfate from the roasted ore material. Also, as indicated in the drawing, the second-stage solution or brine No. 2 containing both sodium chloride and sodium sulfate may be employed for this leaching operation. In either case, the solution is kept hot and such conditions are employed as will serve to convert the lead sulfate of the ore to lead chloride. This step will be carried out in a suitable apparatus and according to standard procedure.

Having now obtained a solution containing the lead as a chloride, the next step is to recover the lead; and a further discovery resides in the fact that the brine of the first stage is serviceable for producing lead carbonate which is commercially free from lead sulfate. This is important, since it now makes it possible to obtain lead carbonate and lead oxide or the metal by the very simple and economical procedure of leaching the lead sulfate from the ore residue as a lead chloride by means of hot brine No. 2 or brine No. 3 and then precipitating the lead from this hot salt solution by means of brine No. 1 or a suitable solution containing sodium carbonate. The precipitate of lead carbonate thus formed from this solution may be removed by filtration, leaving a solution containing sodium chloride and sodium sulfate which may be returned, as indicated, to various stages in the process for use as brine No. 2.

It will now be appreciated that one feature of this invention involves utilizing a complex brine of this nature in which the carbonate radical may be first removed as an insoluble zinc, copper or lead carbonate, after which the sulfate radical is removed as an alkaline earth metal sulfate which is insoluble in the brine and finally the sodium chloride content, or brine No. 2, may be employed for removing the sulfate radical from lead sulfate as a soluble sodium salt. This makes the treatment of a complex zinc and lead ore simple and efficient.

The word "brine" where used in the specification and claims is to be interpreted as covering not only a solution of the salts but also the dry salts derived by evaporating the brine, where the reagent can be employed in the dry condition or after the dry salt has been obtained and then dissolved in water. If the dry salts are employed, they may differ in composition from the original brine solution because of the fact that fractional crystallization of the solution will bring down first one salt or mixture and then another. For example, when the brine is evaporated, the carbonates tend to crystallize first; but, unless expensive purification steps are employed, the crude sodium carbonate thus crystallized out will be contaminated with a considerable amount of sodium sulfate and sodium chloride. Also, the dry salt may be suitably treated to change its composition. It is within the scope of my claims to employ such an impure crude salt in my process, and particularly since the process adds to the amount of chloride and sulfate ions present in the reagent solution and there is no necessity or utility in initially removing them from the carbonate crystals.

It will also be appreciated that it is within the scope of my invention to remove an excess of any anion from the brine or the dry salts at any stage in the process and particularly where the presence of a large quantity thereof hinders the process. For example, the presence of an excessive amount of sodium sulfate in the hot brine used for leaching the lead from the ore residue may be found undesirable, and in that case I may take steps to eliminate some of this excess or employ a brine containing sodium chloride derived from some other stage in the process which has a proper content of the acid ions for the process. However, since the reaction

$$PbSO_4 + 2NaCl = PbCl_2 + Na_2SO_4$$

results in the formation of sodium sulfate, it is not necessary to remove all of the sulfate ion from the brine to be used. The same considerations apply also to the use of the chloride and sulfate brine in the manufacture of hydrochloric acid. It is furthermore to be understood that the claims calling for the use of the sulfate and chloride brine in the manufacture of this acid are to be interpreted as covering the use of either the brine solution or the dry salt; but it is economically desirable to employ the salt in the dry form for the purpose, and this is my preferred practice. In this process, the HCl is generated by the reaction of $H_2SO_4$ on the NaCl of the solution or the dry salt.

In the various stages of the process requiring the use of sodium carbonate to precipitate an ore metal carbonate, the reactions proceed as follows:

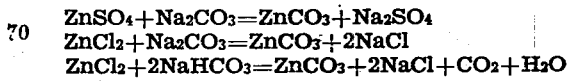
$$ZnSO_4 + Na_2CO_3 = ZnCO_3 + Na_2SO_4$$
$$ZnCl_2 + Na_2CO_3 = ZnCO_3 + 2NaCl$$
$$ZnCl_2 + 2NaHCO_3 = ZnCO_3 + 2NaCl + CO_2 + H_2O$$

Lead, copper and so forth may be substituted for zinc in the equations. From these, it will be seen that the process is effective to remove the carbonate radical from both of these sodium salts as well as to precipitate the desired ore metal. Hence, the brine or the dry salt may contain either or both of the carbonates, $Na_2CO_3$ and $NaHCO_3$.

The drawing and the above description indicate the flexibility of this process and how the brine may be used in many ways for the economical treatment of ore materials and how the process may be made largely cyclic, with this brine as the primary reagent furnishing desired chemicals for the reaction. It will, of course, be understood that various other intermediate steps and purification processes may be employed for removing other ore materials or for eliminating undesired ingredients. The analysis of the brine above given indicates that there are various other elements therein which have not been utilized in the reactions, as above described. If desired, I may take the necessary steps to purify the brine from these undesired ingredients at any stage in the process or I may so modify the process that these undesired ingredients will not produce detrimental reactions as they go along with the brine solutions.

Having thus described my invention, what I claim as new and desire to secure by Letters Patent is:

1. The method of recovering a lead compound from a lead-bearing ore material comprising the steps of forming lead sulfate from the ore material, leaching the ore material with a hot solution containing sodium chloride and forming a solution of lead chloride and sodium chloride, and then treating said lead chloride solution with a brine containing sodium carbonate and sodium sulfate and forming a precipitate of lead carbonate which is commercially free from lead sulfate.

2. The method of forming lead carbonate from a solution containing lead chloride comprising the steps of precipitating lead carbonate from the solution by reaction with a brine containing sodium carbonate, sodium chloride and sodium sulfate and producing lead carbonate which is substantially free from lead sulfate, and thereafter separating the precipitate from the solution and recovering the lead carbonate.

3. The method of treating a complex ore material containing the sulfates of lead and zinc or copper comprising the steps of separating the zinc or copper from the lead sulfate as a sulfate solution, treating the solution with a brine comprising primarily the carbonate, sulfate and chloride of sodium to precipitate the carbonate of zinc or copper and form a brine substantially free from the carbonate radical, and leaching the lead sulfate from the ore residue by the carbonate free brine and thereby causing the complex brine to separate the ore values.

4. The method of recovering and using the carbonate content of a salt mixture containing the sodium salts of hydrochloric, sulfuric and carbonic acids comprising the steps of adding the salt mixture to a hot solution containing sodium and lead chlorides and precipitating lead carbonate therefrom, while leaving substantially all of the chlorine and sulfate ions in solution, crystallizing out a portion of the sodium sulfate, and employing the resultant solution to leach an ore containing lead sulfate and form a solution containing lead and sodium chlorides for further reaction with said salt mixture, whereby the latter serves to recover lead from an ore as lead carbonate.

5. The method of treating an ore material containing copper, lead or zinc comprising the steps of removing the desired metal from the ore residue as a chloride or sulfate solution, treating the solution with a brine comprising primarily the sulfate, carbonate and chloride of sodium and precipitating an ore metal carbonate therefrom, without introducing a new anion into the solution, and providing a second stage brine comprising primarily the sulfate and chloride of sodium which is substantially free from a carbonate, and thereafter treating the second stage brine with an alkaline earth metal chloride to precipitate the sulfate radical therefrom as alkaline earth metal sulfate, thereby leaving a brine comprising primarily the chloride of sodium, whereby an ore metal is recovered and sodium chloride is derived from said complex brine.

6. The method according to claim 5 in which the alkaline earth metal chloride is barium or calcium.

7. The method of treating an ore containing a metal of the group comprising zinc and lead comprising the steps of converting the zinc to a sulfate or chloride in solution, treating the solution with a brine comprising primarily the carbonate, sulfate and chloride of sodium in amount sufficient to remove all of the carbonate from the brine and precipitate zinc carbonate without introducing a new anion into the brine, recovering said zinc carbonate therefrom, thereafter treating the resultant brine with the chloride of an alkaline earth metal which is capable of and is proportioned for precipitating the sulfate radical in the brine as an insoluble alkaline earth metal sulfate, thereby producing a brine solution consisting primarily of sodium chloride, and causing the chloridion of said sodium chloride to chloridize further ore values.

8. The method of treating a roasted sulfide ore containing lead sulfate and a compound of a metal of the group consisting of copper and zinc comprising the steps of chloridizing the ore metal and separating it from the lead sulfate and ore residue as an ore metal chloride solution, treating said solution with a brine comprising primarily the sulfate, carbonate and chloride of sodium to precipitate the metal as a carbonate and remove the carbonate radical from the brine, treating the resultant second stage brine with an alkaline earth metal chloride to precipitate the sulfate radical therefrom and provide a third stage brine comprising primarily the chloride of sodium, and treating the ore residue with the third stage brine to form a solution of lead chloride, and thereby employing anions of the brine serially to recover and separate the values of a complex ore.

9. The method of chloridizing an ore containing a metal oxide comprising the steps of treating the ore with hydrochloric acid to form an ore metal chloride, leaching the chloride from the ore residue, treating the chloride in solution with a complex salt comprising primarily the carbonate, sulfate and chloride of sodium to precipitate the ore metal as a carbonate and form a second stage brine substantially free from the carbonate radical, and treating the combined second stage brine salts with sulfuric acid to form said hydrochloric acid for chloridizing the ore, and thereby using said complex brine both as a source of chlorine for the ore treatment and to separate an ore value from the residue.

10. The method of treating an ore material containing a zinc compound comprising the steps of forming zinc chloride therefrom, treating zinc chloride with a brine comprising sodium sulfate, carbonate and chloride to remove the carbonate radical from the brine and to form zinc carbonate, treating zinc chloride with barium sulfide to form zinc sulfide and a solution of barium chloride, and combining the barium chloride solution with the resultant brine in the second stage to remove the sulfate radical therefrom as insoluble barium sulfate and leave a brine consisting primarily of sodium chloride.

11. The method of treating a complex ore material comprising the steps of converting values thereof to an ore metal chloride or sulfate, treating the latter in solution with a complex brine comprising primarily the sulfate, carbonate and chloride of sodium and precipitating the carbonate radical as an ore metal carbonate without introducing a new anion into solution, then removing sulfate radical from the brine and providing a final stage brine comprising primarily the chloride of sodium, and chloridizing metal values in the ore by means of the chlorine atom derived from said sodium chloride.

12. The method of treating an ore containing a metal oxide according to claim 11 in which the sodium chloride of the final stage brine is treated with sulfuric acid to form hydrochloric acid, and the ore metal oxide is converted to a chloride by said hydrochloric acid.

13. The method of chloridizing an ore containing the oxide of zinc or copper comprising the steps of treating the ore with hydrochloric acid and forming an ore metal chloride, leaching the metal chloride from the residue, treating the chloride in solution with a complex brine comprising primarily the carbonate, sulfate and chloride of sodium to precipitate said metal as a carbonate, treating the second stage brine with an alkaline earth metal chloride to precipitate the sulfate radical therefrom and leave a salt brine substantially free from the sulfate radical, treating the sodium chloride of the resultant salt with sulfuric acid to generate said hydrochloric acid, and thus causing chloridion derived from the original complex brine to chloridize the ore.

14. The method of treating an ore containing zinc and lead sulfides comprising the steps of chloridizing the ore to form zinc chloride and lead sulfate, dissolving the zinc chloride from the ore and treating it with a brine containing sodium carbonate, sulfate and chloride to precipitate the carbonate radical as zinc carbonate, leaching the lead sulfate from the ore residue by a hot brine containing sodium chloride and sulfate and treating the resultant lead chloride solution with some of the original brine to precipitate lead carbonate commercially free from lead sulfate and leave a brine containing sodium chloride and sulfate for further use in the process.

15. The method of treating a roasted sulfide ore material containing lead sulfate and a zinc compound comprising the steps of treating the material with a chloridizing agent to form zinc chloride, separating the zinc chloride from the lead compounds in the ore residue, treating the zinc chloride in solution with barium sulfide to precipitate zinc sulfide therefrom and form a barium chloride solution, treating the latter with a brine comprising primarily the sulfate and chloride of sodium to precipitate the sulfate radical as barium sulfate and form a sodium chloride brine, reducing the barium sulfate to the sulfide for reuse in making zinc sulfide, and dissolving the lead from the residue by means of said sodium chloride brine, whereby the brine serves serially in the recovery of both the zinc and lead in the ore.

16. The method of treating a zinc bearing ore comprising the steps of converting the zinc thereof to a chloride or sulfate and forming a solution of the same, treating said solution with a brine comprising primarily the carbonate, sulfate and chloride of sodium which is proportioned in amount to precipitate all of the carbonate radical from the brine as zinc carbonate without introducing any new anion into solution, recovering the zinc carbonate free from said solution, treating zinc chloride in solution as derived from said ore by means of an alkaline earth metal sulfide to form zinc sulfide and alkaline earth metal chloride, separating said products and treating the brine in the second stage with the alkaline earth metal chloride to remove the sulfate radical therefrom, thereby forming a solution consisting primarily of sodium chloride and employing the brine in the recovery of zinc from the ore.

ROYAL L. SESSIONS.